US012659170B2

(12) United States Patent
Ahuja et al.

(10) Patent No.: US 12,659,170 B2
(45) Date of Patent: Jun. 16, 2026

(54) SYSTEM AND METHOD FOR A WEIGHTED SLOTTED SYNCHRONOUS BLOCKCHAIN CLIENT NETWORK

(71) Applicant: Tata Consultancy Services Limited, Mumbai (IN)

(72) Inventors: Aditya Ahuja, Pune (IN); Vigneswaran Ramachandran, Chennai (IN); Rajan Mindigal Alasingara Bhattachar, Bangalore (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 335 days.

(21) Appl. No.: 18/587,857

(22) Filed: Feb. 26, 2024

(65) Prior Publication Data

US 2024/0323030 A1 Sep. 26, 2024

(30) Foreign Application Priority Data

Mar. 23, 2023 (IN) ............................ 202321020434

(51) Int. Cl.
*G06F 15/173* (2006.01)
*H04L 9/00* (2022.01)
*H04L 9/32* (2006.01)

(52) U.S. Cl.
CPC .......... *H04L 9/3247* (2013.01); *H04L 9/3236* (2013.01); *H04L 9/50* (2022.05)

(58) Field of Classification Search
CPC ...... H04L 9/3239; H04L 67/60; H04L 9/3297
See application file for complete search history.

(56) References Cited

U.S. PATENT DOCUMENTS

2019/0268407 A1* 8/2019 Zeng .................... H04L 9/3247

FOREIGN PATENT DOCUMENTS

ES 2818623 T3 4/2021

OTHER PUBLICATIONS

Myochain: A Blockchain protocol for Delay-bound Transaction Conformation, IEEE Conference Publication (Year: 2023).*
Zhang, Qingzhao et al., "Improvements of Blockchain's Block Broadcasting: An Incentive Approach", https://eprint.iacr.org/2018/1152.pdf.

* cited by examiner

*Primary Examiner* — Padma Mundur
(74) *Attorney, Agent, or Firm* — Finnegan, Henderson, Farabow, Garrett & Dunner, LLP

(57) ABSTRACT

The present disclosure provides weight based slotted synchronous blockchain client network. Conventional blockchain consensus protocols heavily rely on synchrony assumptions of the underlying network. However, little attention has so far been given to similar assumptions on blockchain client networks. Such assumptions would be useful in deriving bounds on confirmation times of transactions through the blockchain protocol. To overcome the challenges of the conventional approaches, the present disclosure provides a weight based slotted synchronous blockchain client network. The blockchain client network of the present disclosure is slotted, wherein at most one transaction is submitted in each slot by one of the client nodes. Further, there exists a notion of synchrony in the peering between the client nodes and the blockchain nodes. In an embodiment, for each submitted transaction, there is an upper-bound on the number of slots on the reception of the said transaction at an arbitrary blockchain node.

18 Claims, 3 Drawing Sheets

300 receiving a blockchain transaction request from a user associated with a source client node from among a plurality of client nodes associated with a blockchain client network, wherein the blockchain client network is a weight based slotted synchronous network, and wherein the blockchain client network comprises the plurality of client nodes, a plurality of consensus nodes and a plurality of routers

302 obtain a network-level information associated with the blockchain transaction request using a network data extraction technique

304 obtain a plurality of delays associated with each of a plurality of path routers placed between the source client node and the destination consensus node based on the network-level information using delay detection techniques

306 obtain a transmission slot associated with the source client node only if a sum of the plurality of delays associated with plurality of path routers is less than or equal to a slot epoch length, wherein the transmission slot associated with the source client node is generated using a dynamic slot allocation technique, wherein the dynamic slot allocation technique is one of, (a) an uniform client slot allocation and (b) a Stake based client slot allocation

308 broadcast the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes

310

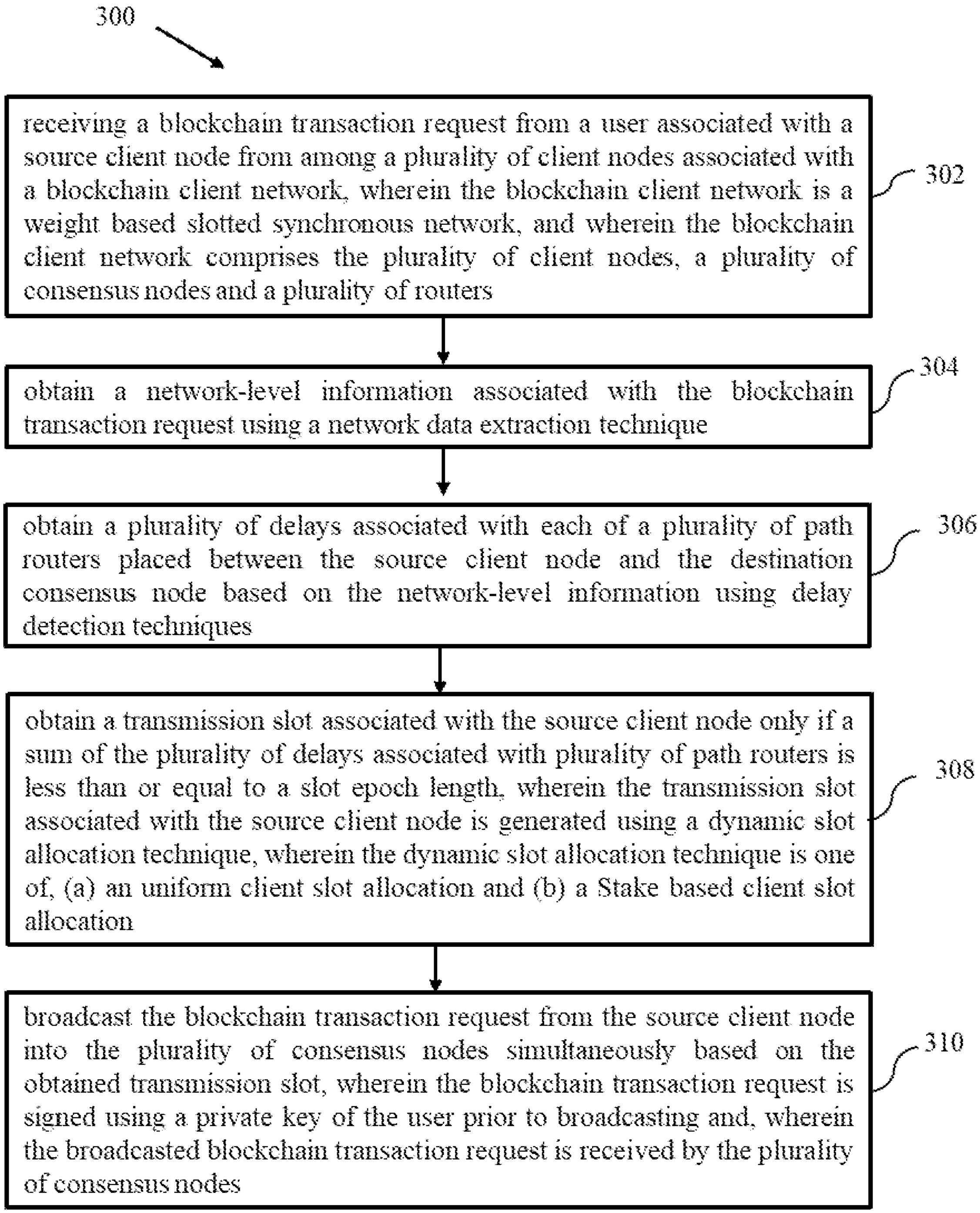

FIG. 3

SYSTEM AND METHOD FOR A WEIGHTED SLOTTED SYNCHRONOUS BLOCKCHAIN CLIENT NETWORK

PRIORITY CLAIM

This U.S. patent application claims priority under 35 U.S.C. § 119 to: Indian patent application Ser. No. 202321020434, filed on Mar. 23, 2023. The entire contents of the aforementioned application are incorporated herein by reference.

TECHNICAL FIELD

The disclosure herein generally relates to the field of blockchain and, more particular, to a method and system for weight based slotted synchronous blockchain client network for collision free transaction broadcast.

BACKGROUND

Blockchain is a method of recording information that makes it impossible or difficult for the system to be changed, hacked, or manipulated. A blockchain is a distributed ledger that duplicates and distributes transactions across the network of computers participating in the blockchain. Blockchains are mainly used in applications in a decentralized setting like digital transactions where delay is not acceptable. Hence in order to enable good Quality of Service (QOS) for the customers, these transactions executions/commits need to be fast, robust and secure and thus calls for minimal latency in transaction commits. For example, cryptographic currencies such as Bitcoin can enable new applications, such as smart contracts and fair protocols to simplify currency conversions, and to avoid trusted centralized authorities that regulate transactions.

However, conventional approaches suffer from a trade-off between latency and confidence in a transaction. For example, achieving a high confidence that a transaction has been confirmed in Bitcoin requires about an hour long wait. On the other hand, applications that require low latency cannot be certain that their transaction will be confirmed and must trust the payer to not double-spend. Conventional blockchain consensus protocols heavily rely on synchrony assumptions of the underlying network. However, little attention has so far been given to similar assumptions on blockchain client networks. Such assumptions would be useful in deriving bounds on confirmation times of transactions through the blockchain protocol.

SUMMARY

Embodiments of the present disclosure present technological improvements as solutions to one or more of the above-mentioned technical problems recognized by the inventors in conventional systems. For example, in one embodiment, a method for weight based slotted synchronous blockchain client network for collision free transaction broadcast is provided. The method includes receiving, via an interface associated with a source client node, a blockchain transaction request from a user associated with a source client node from among a plurality of client nodes associated with a blockchain client network, wherein the blockchain client network is a weight based slotted synchronous network, and wherein the blockchain client network comprises the plurality of client nodes, a plurality of consensus nodes and a plurality of routers. Further, the method includes obtaining, by one or more hardware processors of the source client node, a network-level information associated with the blockchain transaction request using a network data extraction technique. Furthermore, the method includes obtaining, by the one or more hardware processors of the source client node, a plurality of delays associated with each of a plurality of path routers placed between the source client node and the destination consensus node based on the network-level information using delay detection techniques. Furthermore, the method includes obtaining, by the one or more hardware processors of the source client node, a transmission slot associated with the source client node only if a sum of the plurality of delays associated with plurality of path routers is less than or equal to a slot epoch length, wherein the transmission slot associated with the source client node is generated using a dynamic slot allocation technique, wherein the dynamic slot allocation technique is one of, (a) an uniform client slot allocation and (b) a Stake based client slot allocation. Finally, the method includes broadcasting, by the one or more hardware processors of the source client node, the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes.

In another aspect, a system for weight based slotted synchronous blockchain client network for collision free transaction broadcast is provided. The system includes a client network comprising a plurality of clients, a blockchain network comprising a plurality of consensus nodes, wherein a source client node from the client network comprises at least one memory storing programmed instructions; one or more Input/Output (I/O) interfaces; and one or more hardware processors operatively coupled to the at least one memory, wherein the one or more hardware processors of the source client node is configured by the programmed instructions to receive a blockchain transaction request from a user associated with a source client node from among a plurality of client nodes associated with a blockchain client network, wherein the blockchain client network is a weight based slotted synchronous network, and wherein the blockchain client network comprises the plurality of client nodes, a plurality of consensus nodes and a plurality of routers. Further, the one or more hardware processors of the source client node is configured by the programmed instructions to obtain a network-level information associated with the blockchain transaction request using a network data extraction technique. Furthermore, the one or more hardware processors of the source client node is configured by the programmed instructions to obtain a plurality of delays associated with each of a plurality of path routers placed between the source client node and the destination consensus node based on the network-level information using delay detection techniques. Furthermore, the one or more hardware processors of the source client node is configured by the programmed instructions to obtain a transmission slot associated with the source client node only if a sum of the plurality of delays associated with plurality of path routers is less than or equal to a slot epoch length, wherein the transmission slot associated with the source client node is generated using a dynamic slot allocation technique, wherein the dynamic slot allocation technique is one of, (a) an uniform client slot allocation and (b) a Stake based client slot allocation. Finally, the one or more hardware processors of the source client node is configured by the programmed instructions to broadcast the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes.

In yet another aspect, a computer program product including a non-transitory computer-readable medium having embodied therein a computer program for weight based slotted synchronous blockchain client network for collision free transaction broadcast is provided. The computer readable program, when executed on a computing device, causes the computing device to receive a blockchain transaction request from a user associated with a source client node from among a plurality of client nodes associated with a blockchain client network, wherein the blockchain client network is a weight based slotted synchronous network, and wherein the blockchain client network comprises the plurality of client nodes, a plurality of consensus nodes and a plurality of routers. Further, the computer readable program, when executed on a computing device, causes the computing device to obtain a network-level information associated with the blockchain transaction request using a network data extraction technique. Furthermore, the computer readable program, when executed on a computing device, causes the computing device to obtain a plurality of delays associated with each of a plurality of path routers placed between the source client node and the destination consensus node based on the network-level information using delay detection techniques. Furthermore, the computer readable program, when executed on a computing device, causes the computing device to obtain a transmission slot associated with the source client node only if a sum of the plurality of delays associated with plurality of path routers is less than or equal to a slot epoch length, wherein the transmission slot associated with the source client node is generated using a dynamic slot allocation technique, wherein the dynamic slot allocation technique is one of, (a) an uniform client slot allocation and (b) a Stake based client slot allocation. Finally, the computer readable program, when executed on a computing device, causes the computing device to broadcast the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is an exemplary flow diagram illustrating the processor implemented method for weight based slotted synchronous blockchain client network for collision free transaction broadcast implemented by a client node of FIG. 1, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Blockchains are mainly used in applications like digital transactions where delay is not acceptable. Hence in order to enable good Quality of Service (QOS) for the customers, these transactions executions/commits need to be fast, robust and secure and thus calls for minimal latency in transaction commits. For example, cryptographic currencies such as Bitcoin can enable new applications, such as smart contracts and fair protocols to simplify currency conversions, and to avoid trusted centralized authorities that regulate transactions.

Conventional blockchain consensus protocols heavily rely on synchrony assumptions of the underlying network. However, little attention has so far been given to similar assumptions on blockchain client networks. Such assumptions would be useful in deriving bounds on confirmation times of transactions through the blockchain protocol.

To overcome the challenges of the conventional approaches, embodiments herein provide a weight based slotted synchronous blockchain client network. The blockchain client network of the present disclosure is slotted, wherein at most one transaction is submitted in each slot by one of the client nodes. Further, there exists a notion of synchrony in the peering between the client nodes and the blockchain nodes. In an embodiment, for each submitted transaction, there is an upper-bound on the number of slots on the reception of the said transaction at an arbitrary blockchain node.

Figure 1:
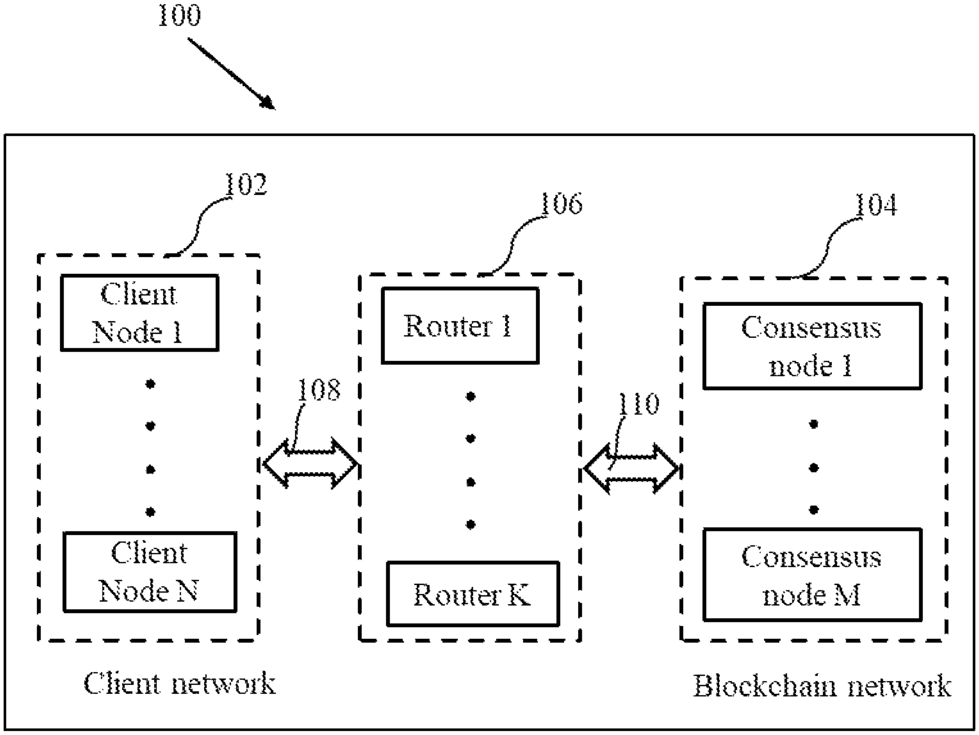
FIG. 1 is a networking architecture for a system for weight based slotted synchronous blockchain client network for collision free transaction broadcast, in accordance with some embodiments of the present disclosure.
Figure 2:
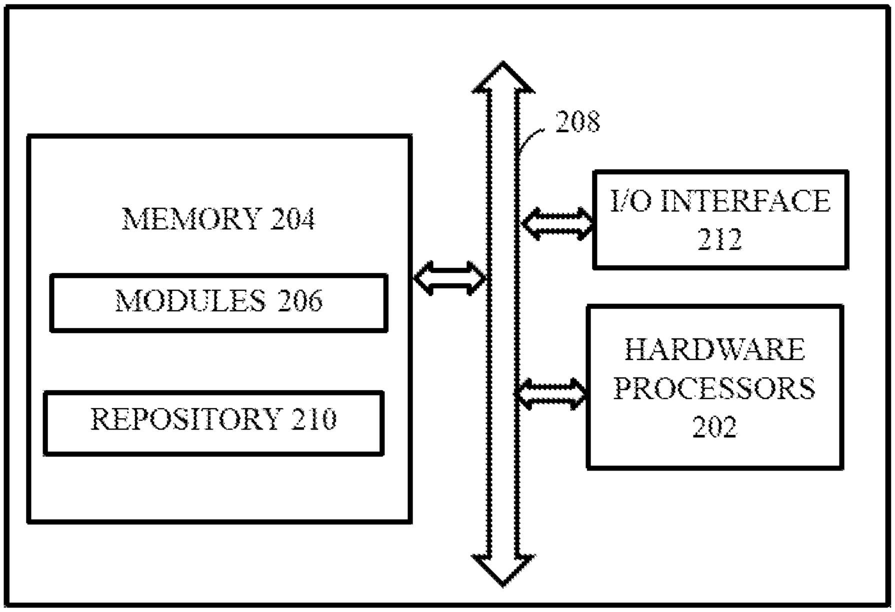
FIG. 2 is a functional block diagram of client nodes, consensus nodes and routers of the system of FIG. 1 implementing weight based slotted synchronous blockchain client network for collision free transaction broadcast, in accordance with some embodiments of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 is a networking architecture for a system 100 for weight based slotted synchronous blockchain client network for collision free transaction broadcast, in accordance with some embodiments of the present disclosure. The architecture of system 100 includes a client network 102 comprising a plurality of client nodes, a blockchain network 104 comprising a plurality of blockchain/consensus nodes and a plurality of routers 106. The blockchain network further includes a distributed ledger, consensus algorithms, proof of work and proof of stake. The plurality of blockchain/consensus nodes honestly follows a specified blockchain consensus algorithm. A blockchain consensus algorithm is a protocol through which all peers of a blockchain network reach a common agreement about the present state of the distributed ledger. Essentially, the consensus protocol makes sure that every new block that is added to the blockchain is the one and only version of the truth that is agreed upon by all the nodes in the blockchain. The blockchain consensus protocol includes some specific objectives such as coming to an agreement, collaboration, cooperation, equal rights to every node, and participation of each node in the consensus process. Each router is an air traffic controller which directs data packets between the client network 102 and the blockchain network 104. To direct packets effectively, the router uses an internal dynamic routing table (a list of paths to various network destinations). The router reads a packet's header to determine where it is going, then consults the routing table to figure out the most efficient path to that destination. It then forwards the packet to the next network in the path.

The client network 102, the blockchain network 104 and the plurality of routers 106 are connected via network connections 108 and 110. In an embodiment, the network connections 108 and 110 is a wired communication network or a wireless communication network. In an embodiment, each of the plurality of client nodes of the client network 102 are connected to each other via respective networking interfaces. Each of the plurality of consensus nodes of the blockchain network 104 are connected to each other via respective networking interfaces and each of the plurality of routers 106 are connected to each other via respective networking interfaces.

FIG. 2 is a functional block diagram 200 of client nodes, consensus nodes and routers of the system 100 for weight based slotted synchronous blockchain client network for collision free transaction broadcast, implemented by the architecture of FIG. 1, in accordance with some embodiments of the present disclosure. The system 200 includes or is otherwise in communication with hardware processors 202, at least one memory such as a memory 204, an I/O interface 212. The hardware processors 202, memory 204, and the Input/Output (I/O) interface 212 may be coupled by a system bus such as a system bus 208 or a similar mechanism. In an embodiment, the hardware processors 202 can be one or more hardware processors.

The I/O interface 212 may include a variety of software and hardware interfaces, for example, a web interface, a graphical user interface, and the like. The I/O interface 212 may include a variety of software and hardware interfaces, for example, interfaces for peripheral device(s), such as a keyboard, a mouse, an external memory, a printer and the like. Further, the I/O interface 212 may enable the system 200 to communicate with other devices, such as web servers, and external databases.

The I/O interface 212 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 212 may include one or more ports for connecting several computing systems with one another or to another server computer. The I/O interface 212 may include one or more ports for connecting several devices to one another or to other devices such as the client nodes of the client network, routers and the consensus nodes of the blockchain network.

The one or more hardware processors 202 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 206. The memory 204 also includes a data repository (or repository) 210 for storing data processed, received, and generated by the plurality of modules 206.

The plurality of modules 206 include programs or coded instructions that supplement applications or functions performed by the system 200 for weight based slotted synchronous blockchain client network for collision free transaction broadcast. The plurality of modules 206, amongst other things, can include routines, programs, objects, components, and data structures, which performs particular tasks or implement particular abstract data types. The plurality of modules 206 may also be used as, signal processor(s), node machine(s), logic circuitries, and/or any other device or component that manipulates signals based on operational instructions. Further, the plurality of modules 206 can be used by hardware, by computer-readable instructions executed by the one or more hardware processors 202, or by a combination thereof. The plurality of modules 206 can include various sub-modules (not shown). The plurality of modules 206 may include computer-readable instructions that supplement applications or functions performed by the system 200 for weight based slotted synchronous blockchain client network for collision free transaction broadcast.

The data repository (or repository) 210 may include a plurality of abstracted piece of code for refinement and data that is processed, received, or generated as a result of the execution of the plurality of modules in the module(s) 206.

Although the data repository 210 is shown internal to the system 200, it will be noted that, in alternate embodiments, the data repository 210 can also be implemented external to the system 200, where the data repository 210 may be stored within a database (repository 210) communicatively coupled to the system 200. The data contained within such external database may be periodically updated. For example, new data may be added into the database (not shown in FIG. 2) and/or existing data may be modified and/or non-useful data may be deleted from the database. In one example, the data may be stored in an external system, such as a Lightweight Directory Access Protocol (LDAP) directory and a Relational Database Management System (RDBMS).

FIG. 3 is an exemplary flow diagram illustrating the processor implemented method 300 for weight based slotted synchronous blockchain client network for collision free transaction broadcast implemented by a client node of FIG. 1, in accordance with some embodiments of the present disclosure.

In an embodiment, the system 200 includes one or more data storage devices or the memory 204 operatively coupled to the one or more hardware processor(s) 202 and is configured to store instructions for execution of steps of the method 300 by the one or more hardware processors 202. The steps of the method 300 of the present disclosure will now be explained with reference to the components or blocks of the system 100 and the system 200 as depicted in FIGS. 1 and 2 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 202 of a source client node, are configured by the programmed instructions to receiving a blockchain transaction request from a user via an interface associated with a source client node from among a plurality of client nodes associated with a blockchain client network.

In an embodiment, the blockchain client network is a weight based slotted synchronous network, wherein the blockchain client network comprises the plurality of client nodes $[m]:=\{1,2, \ldots, m\}$, a plurality of consensus nodes $[n]:=\{1,2, \ldots, n\}$ and a plurality of routers. Each of the plurality of client nodes are associated with a plurality of weights. The plurality of weights includes a slot weight and a transmission weight. Peering between each of the plurality of client nodes and each of the plurality of consensus nodes in the blockchain client network is performed based on the plurality of weights. The blockchain client network is associated with a Collision Resistant Hash Function (CRHF) and a signature scheme S. For example, SHA-256 is used as CRHF and the ElGamal/RSA is used as the signature scheme.

In an embodiment, each client $i \in [m]$ has a slot allocation weight $$w_i^S$$

and a transmission delay weight $$w_i^T$$

(both positive integers). There exists positive integer $\Delta_c$ such that $$w_i^T \leq \Delta_C.$$

B(k; p, W) denote a binomial distribution. Here, B is a Binomial distribution as part of cryptographic sortition, k; p, W are distribution parameters. Slot epochs will be denoted by e. The slot delay for a client $i \in [m]$ will be denoted by $\Delta_i \leq [\Delta_c, 2\Delta_c - 1]$. The slot delay is a bound on the number of slots any transaction by client i is delayed. The finalized blockchain at slot e is denoted by $Chain^e$. Finally, N denote the network administrator. The finalized blockchain is a part of the blockchain for which the transactions are considered as final.

At step 304 of the method 300, the one or more hardware processors 202 of the source client node are configured by the programmed instructions to obtain a network-level information associated with the blockchain transaction request using a network data extraction technique/tool. For example, the network data extraction technique/tool includes "ping", "traceroute" and the like. In an embodiment, the network-level information includes Internet Protocol (IP) address of the source client node, IP address of a destination consensus node from among the plurality of consensus nodes, number of routers placed between the source client node and the destination consensus node, and number of router hops between the source client node and the destination consensus node.

At step 306 of the method 300, the one or more hardware processors 202 of the source client node are configured by the programmed instructions to obtain a plurality of delays associated with each of a plurality of path routers placed between the source client node and the destination consensus node based on the network-level information using delay detection techniques. For example, the plurality of delays comprises a transmission delay, a propagation delay, and a queuing delay. Transmission delay is the time it takes for the network interface adapter to push the transaction packet on the physical link. The propagation delay is the time it takes for the transaction packet to travel over the physical link and the queuing delay is a the time that the transaction packet is delayed at the queues of one or more routers.

At step 308 of the method 300, the one or more hardware processors 202 of the source client node are configured by the programmed instructions to obtain a transmission slot associated with the source client node only if a sum of the plurality of delays associated with plurality of path routers is less than or equal to a slot epoch length. The transmission slot associated with the source client node is generated using a dynamic slot allocation technique, wherein the dynamic slot allocation technique is one of, (a) uniform client slot allocation and (b) Stake based client slot allocation.

In an embodiment, the process implemented by the method of uniform client slot allocation selects a client for slot allocation by computing a modulus based on a plurality of parameters comprising the slot epoch, the CRHF, current state of the blockchain, number of client nodes as shown in the following pseudocode 1. For example, if the number of clients is 10, the last hex digit of SHA-256 is "C" (decimal value is 12). If mod is computed, then (12 mod 10)+1=3. Hence client 3 is selected here.

Pseudocode 1 achieves uniform distribution over the clients for slot allocation.

Pseudocode 1

Uniform Client Slot Allocation

Given $Chain^e$ is the finalized blockchain at epoch e

H: $\{0,1\}^* \rightarrow \{0,1\}^{hlen}$ is an ideal CRHF//hlen is the length of the hash function Procedure UniformElect(m, e, $Chain^e$)

Return (H($Chain^e$, e) mod m)+1

EndProcedure

In an embodiment, the method of stake based client slot allocation includes the following steps. Initially, a plurality of stake parameters are received. Ian embodiment, the plurality of stake parameters includes the current state of the blockchain, the slot epoch, a signature, a probability distribution value and a weight associated with each of the plurality of client nodes. After receiving the plurality of stake parameters, a vote is computed for each of the plurality of client node based on the plurality of stake parameters. Finally, the client node with a maximum vote from among the plurality of client nodes for a corresponding epoch based on the vote associated with each of the plurality of client nodes is selected. In an embodiment, a pseudocode 2 explains the stake based client allocation.

Given a slot weight $$w_i^S$$

associated with each client $i∈[m], Pseudocode 2 achieves a stake (proportional to)

$$w_i^S$$

based slot allocation for clients.

Pseudocode 2

Stake Based Client Slot Allocation

Given $Chain^e$ is the finalized blockchain at epoch e

H: $\{0,1\}^* \rightarrow \{0,1\}^{hlen}$ is an ideal CRHF $p \in [0,1]$ $$B(k;\, p,\, W) := \binom{W}{k} p^k (1-p)^{W-k} \; // \; W$$

is a binomial distribution parameter

Procedure ClientVote $$(\text{Chain}^e,\, e,\, \pi_i,\, p,\, w_i^S \; // \; \pi_i$$

is a signed message for client i for $$w_i^s$$

regarding the slot weight $1: z < -0$ $2: \text{while } \dfrac{H(\text{Chain}^e, e, \pi_i,)}{2^{hlen}} \left[\sum_{k=0}^{z} B(k; p, w_i^S), \left[\sum_{k=0}^{z+1} B(k; p, w_i^S)\right.\right.$ $2.1: z \leftarrow z + 1$ 3. return z EndProcedure Procedure StakeElect ($Chain^e$, e, m)

1. forall i∈[m]: compute ClientVote ($Chain^e$, e, $\pi_i$, p, $$w_i^S)$$

2. return client index with the highest vote (break ties with the lowest client number).

EndProcedure

For example, considering 2 clients with weights $$w_i^S = 5$$

and $$w_2^S = 7,$$

in expectation, client 2 will get higher vote for slot allocation.

At step 310 of the method 300, the one or more hardware processors 102 of the source client node are configured by the programmed instructions to broadcast the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes.

In an embodiment, the overall pseudocode is given as pseudocode 3. The present weighted slotted synchronous client network $N_c$ specification is given below. Every transaction transmitted by a client i∈[m] is positioned in an arbitrary consensus node's mempool by no more than $\Delta_i$ slots. The network requires synchronized clocks across clients using Network Time Protocol (NTP). Slots are represented as epochs, and slot duration is set by the network administrator N. For each transaction submitted over $N_c$, at any two arbitrary blockchain nodes, the maximum relative gap of the said transaction's location in the two blockchain nodes' mempool is no greater than $4\Delta_c$. Here, $4\Delta_c$ was identified as the maximum possible delay during transactions. For example, transactions from the previous $2\Delta_c$ slots and future $2\Delta_c$ slots can be queued before a specific transaction in some network execution, resulting in a $2\Delta_c$ relative position gap.

Pseudocode 3

Network $N_c$: Weighted Slotted Synchronous Blockchain Client Network

Given
Set of clients [m]:={1,2, . . . , m}
NTP Synchronized Client Slots with epochs e
An ideal H: {0,1}*→{0,1}hlen
A Signature Scheme S=(dsig, dver)

$$\text{for all } i \in [m] : \pi_i := sig_N(i, w_i^S, w_i^T), dsig_{sk_N}(i, w_i^S, w_i^T),$$

where
forall $\pi_i$:==dver($vk_N$, $\pi_i$)=1
Set of blockchain nodes [n]:={1,2, . . . , n}
A positive integer $\Delta_c$ Procedure $N_c$ 1: forall i∈[m]: i follows slot allocation according to one of Pseudocode 1 1 or Pseudocode 1 2, and transmits a transaction.
2: forall i∈[m], j∈[n], there is at least one router, and at most $\Delta_c-1$ routers, from i to j
3: forall i∈[m], j∈[n],: The transmission, propagation, and queuing delays for each hop from i to j is less than or equal to the slot epoch e length.
4: A random router (computed using ($\pi_i$ mod k)+1)) between i and j withholds the transaction packet for $$\Delta_C - w_i^T$$

slot epochs.
EndProcedure

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of developing a blockchain client network design directed towards the interfacing between transacting clients and mempools of consensus nodes which are part of a single blockchain network. A mempool/memory pool is an organized queue where transactions are stored and sorted before being added to a newly created block. The memory pool holds "fresh" or unconfirmed transactions (stored as individual transactions). The blockchain holds "archived" or confirmed transactions (packaged in "blocks"). Further, the present disclosure provides a slotted system for non-colliding transaction broadcast by clients, and synchronous time bound on the reception of each transaction by the blockchain nodes over the network.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMS, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, via an interface associated with a source client node, a blockchain transaction request from a user associated with a source client node from among a plurality of client nodes associated with a blockchain client network, wherein the blockchain client network is a weight based slotted synchronous network, and wherein the blockchain client network comprises the plurality of client nodes, a plurality of consensus nodes and a plurality of routers;

obtaining, by one or more hardware processors of the source client node, a network-level information associated with the blockchain transaction request using a network data extraction technique;

obtaining, by the one or more hardware processors of the source client node, a plurality of delays associated with each of a plurality of path routers placed between the source client node and the destination consensus node based on the network-level information using delay detection techniques;

obtaining, by the one or more hardware processors of the source client node, a transmission slot associated with the source client node only if a sum of the plurality of delays associated with plurality of path routers is less than or equal to a slot epoch length, wherein the transmission slot associated with the source client node is generated using a dynamic slot allocation technique, wherein the dynamic slot allocation technique is one of, (a) an uniform client slot allocation and (b) a Stake based client slot allocation; and broadcasting, by the one or more hardware processors of the source client node, the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes.

2. The method of claim 1, wherein each of the plurality of client nodes are associated with a plurality of weights, wherein the plurality of weights comprises a slot weight and the transmission weight, wherein peering between each of the plurality of client nodes and each of the plurality of consensus nodes in the blockchain client network is performed based on the plurality of weights, and wherein the blockchain client network is associated with a Collision Resistant Hash Function (CRHF) and a signature scheme.

3. The method of claim 1, wherein the network-level information comprises Internet Protocol (IP) address of the source client node, IP address of a destination consensus node from among the plurality of consensus nodes, number of routers placed between the source client node and the destination consensus node, and number of router hops between the source client node and the destination consensus node.

4. The method of claim 1, wherein the plurality of delays comprises a transmission delay, a propagation delay, and a queuing delay.

5. The method of claim 1, wherein the uniform client slot allocation selects a client for slot allocation by computing a modulus based on a plurality of parameters comprising the slot epoch, the CRHF, current state of the blockchain, number of client nodes.

6. The method of claim 1, wherein the stake based client slot allocation comprises:

receiving a plurality of stake parameters, wherein the plurality of stake parameters comprises the current state of the blockchain, the slot epoch, a signature, a probability distribution value and a weight associated with each of the plurality of client nodes;

computing a vote for each of the plurality of client node based on the plurality of stake parameters; and selecting a client node from among the plurality of client nodes for a corresponding epoch based on the vote associated with each of the plurality of client nodes, wherein the client node with a maximum vote is selected for slot allocation.

7. A system comprising:

a client network comprising a plurality of clients, a blockchain network comprising a plurality of consensus nodes, wherein a source client node from the client network comprises at least one memory storing programmed instructions; one or more Input/Output (I/O) interfaces; and one or more hardware processors operatively coupled to the at least one memory, wherein the one or more hardware processors of the source client node is configured by the programmed instructions to:

receive a blockchain transaction request from a user associated with a source client node from among a plurality of client nodes associated with a blockchain client network, wherein the blockchain client network is a weight based slotted synchronous network, and wherein the blockchain client network comprises the plurality of client nodes, a plurality of consensus nodes and a plurality of routers;

obtain a network-level information associated with the blockchain transaction request using a network data extraction technique;

obtain a plurality of delays associated with each of a plurality of path routers placed between the source client node and the destination consensus node based on the network-level information using delay detection techniques;

obtain a transmission slot associated with the source client node only if a sum of the plurality of delays associated with plurality of path routers is less than or equal to a slot epoch length, wherein the transmission slot associated with the source client node is generated using a dynamic slot allocation technique, wherein the dynamic slot allocation technique is one of, (a) an uniform client slot allocation and (b) a Stake based client slot allocation; and broadcast the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes.

8. The system of claim 7, wherein each of the plurality of client nodes are associated with a plurality of weights, wherein the plurality of weights comprises a slot weight and the transmission weight, wherein peering between each of the plurality of client nodes and each of the plurality of consensus nodes in the blockchain client network is performed based on the plurality of weights, and wherein the blockchain client network is associated with a Collision Resistant Hash Function (CRHF) and a signature scheme.

9. The system of claim 7, wherein the network-level information comprises Internet Protocol (IP) address of the source client node, IP address of a destination consensus node from among the plurality of consensus nodes, number of routers placed between the source client node and the destination consensus node, and number of router hops between the source client node and the destination consensus node.

10. The system of claim 7, wherein the plurality of delays comprises a transmission delay, a propagation delay, and a queuing delay.

11. The system of claim 7, wherein the uniform client slot allocation selects a client for slot allocation by computing a modulus based on a plurality of parameters comprising the slot epoch, the CRHF, current state of the blockchain, number of client nodes.

12. The system of claim 7, wherein the stake based client slot allocation comprises:

receiving a plurality of stake parameters, wherein the plurality of stake parameters comprises the current state of the blockchain, the slot epoch, a signature, a probability distribution value and a weight associated with each of the plurality of client nodes;

computing a vote for each of the plurality of client node based on the plurality of stake parameters; and selecting a client node from among the plurality of client nodes for a corresponding epoch based on the vote associated with each of the plurality of client nodes, wherein the client node with a maximum vote is selected for slot allocation.

13. One or more non-transitory machine-readable information storage mediums comprising one or more instructions which cause:

receiving, via an interface associated with a source client node, a blockchain transaction request from a user associated with a source client node from among a plurality of client nodes associated with a blockchain client network, wherein the blockchain client network is a weight based slotted synchronous network, and wherein the blockchain client network comprises the plurality of client nodes, a plurality of consensus nodes and a plurality of routers;

obtaining, by one or more hardware processors of the source client node, a network-level information associated with the blockchain transaction request using a network data extraction technique;

obtaining, by the one or more hardware processors of the source client node, a plurality of delays associated with each of a plurality of path routers placed between the source client node and the destination consensus node based on the network-level information using delay detection techniques;

obtaining, by the one or more hardware processors of the source client node, a transmission slot associated with the source client node only if a sum of the plurality of delays associated with plurality of path routers is less than or equal to a slot epoch length, wherein the transmission slot associated with the source client node is generated using a dynamic slot allocation technique, wherein the dynamic slot allocation technique is one of, (a) an uniform client slot allocation and (b) a Stake based client slot allocation; and broadcasting, by the one or more hardware processors of the source client node, the blockchain transaction request from the source client node into the plurality of consensus nodes simultaneously based on the obtained transmission slot, wherein the blockchain transaction request is signed using a private key of the user prior to broadcasting and, wherein the broadcasted blockchain transaction request is received by the plurality of consensus nodes.

14. The one or more non-transitory machine-readable information storage mediums of claim 13, wherein each of the plurality of client nodes are associated with a plurality of weights, wherein the plurality of weights comprises a slot weight and the transmission weight, wherein peering between each of the plurality of client nodes and each of the plurality of consensus nodes in the blockchain client network is performed based on the plurality of weights, and wherein the blockchain client network is associated with a Collision Resistant Hash Function (CRHF) and a signature scheme.

15. The one or more non-transitory machine-readable information storage mediums of claim 13, wherein the network-level information comprises Internet Protocol (IP) address of the source client node, IP address of a destination consensus node from among the plurality of consensus nodes, number of routers placed between the source client node and the destination consensus node, and number of router hops between the source client node and the destination consensus node.

16. The one or more non-transitory machine-readable information storage mediums of claim 13, wherein the plurality of delays comprises a transmission delay, a propagation delay, and a queuing delay.

17. The one or more non-transitory machine-readable information storage mediums of claim 13, the uniform client slot allocation selects a client for slot allocation by computing a modulus based on a plurality of parameters comprising the slot epoch, the CRHF, current state of the blockchain, number of client nodes.

18. The one or more non-transitory machine-readable information storage mediums of claim 13, wherein the stake based client slot allocation comprises:

receiving a plurality of stake parameters, wherein the plurality of stake parameters comprises the current state of the blockchain, the slot epoch, a signature, a probability distribution value and a weight associated with each of the plurality of client nodes;

computing a vote for each of the plurality of client node based on the plurality of stake parameters; and selecting a client node from among the plurality of client nodes for a corresponding epoch based on the vote associated with each of the plurality of client nodes, wherein the client node with a maximum vote is selected for slot allocation.

* * * * *